United States Patent
Ballantyne (10) Patent No.: US 9,634,891 B2
(45) Date of Patent: Apr. 25, 2017

(54) DISCOVERY OF MANAGEMENT ADDRESS/INTERFACE VIA MESSAGES SENT TO NETWORK MANAGEMENT SYSTEM

(71) Applicant: CISCO Technology, Inc., San Jose, CA (US)

(72) Inventor: Andrew Ballantyne, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 549 days.

(21) Appl. No.: 14/150,973

(22) Filed: Jan. 9, 2014

(65) Prior Publication Data

US 2015/0195148 A1    Jul. 9, 2015

(51) Int. Cl.
*H04L 12/24* (2006.01)
*H04L 12/18* (2006.01)
*H04L 12/26* (2006.01)

(52) U.S. Cl.
CPC ......... *H04L 41/0806* (2013.01); *H04L 12/18* (2013.01); *H04L 41/0213* (2013.01); *H04L 41/0681* (2013.01); *H04L 43/10* (2013.01)

(58) Field of Classification Search
CPC . H04L 12/18; H04L 41/0213; H04L 41/0681; H04L 41/0806; H04L 41/50; H04L 43/10
See application file for complete search history.

(56) References Cited

U.S. PATENT DOCUMENTS

| | | | | |
|---|---|---|---|---|
| 5,835,725 A * | 11/1998 | Chiang | ................... | H04L 29/06 709/228 |
| 2005/0188069 A1* | 8/2005 | Mohandas | ........ | H04L 29/12264 709/223 |
| 2006/0168070 A1* | 7/2006 | Thompson | .............. | G06F 9/542 709/206 |
| 2008/0046551 A1* | 2/2008 | Hall | .................... | H04L 41/0813 709/223 |
| 2008/0189405 A1* | 8/2008 | Zarenin | ............... | H04L 12/2602 709/224 |
| 2008/0228908 A1* | 9/2008 | Link | ....................... | H04L 41/12 709/223 |
| 2010/0030875 A1* | 2/2010 | Visser | ................ | H04L 41/0806 709/220 |
| 2013/0136123 A1* | 5/2013 | Ge | ...................... | H04L 12/4645 370/390 |
| 2014/0226653 A1* | 8/2014 | Miller | ................... | H04L 65/607 370/352 |

(Continued)

*Primary Examiner* — Glenton B Burgess
*Assistant Examiner* — Brandon L Sykes
(74) *Attorney, Agent, or Firm* — Patteron + Sheridan LLP (57) ABSTRACT

A network management application executing on a first computing system may discover a first interface on a network device and establish a connection with the network device over the first interface. In response, an identification (ID) value is generated and sent, over the connection established with the network device over the first interface, in a message that includes the ID value. The message sent to the network device over the first interface provokes the device to send a response message to the network management application over a second interface. The second interface may generally correspond to a preferred management interface of the network device.

20 Claims, 9 Drawing Sheets

(56) References Cited

U.S. PATENT DOCUMENTS

| | | | |
|---|---|---|---|
| 2014/0279808 A1* | 9/2014 | Strassner | G06Q 10/10 706/47 |
| 2015/0139036 A1* | 5/2015 | Liu | H04L 45/02 370/255 |
| 2015/0188778 A1* | 7/2015 | Asayag | H04L 41/5041 709/224 |
| 2016/0323881 A1* | 11/2016 | Bhora | H04W 72/0446 |

* cited by examiner

DISCOVERY OF MANAGEMENT ADDRESS/INTERFACE VIA MESSAGES SENT TO NETWORK MANAGEMENT SYSTEM

TECHNICAL FIELD

This disclosure generally relates to computer software and systems used to manage network devices, e.g., switches and routers. More specifically, this disclosure presents techniques for identifying a management interface on a network device discovered by a network management system.

BACKGROUND

Enterprise and data center networks have become increasingly complex. For example, service provider data centers use a variety of switches and routers (collectively referred to herein as a router) to connect thousands of computing systems. Even a relatively small data center can include dozens of switch and routing devices. A data center typically includes multiple racks of computing systems. In turn, each rack may include a switch used to connect the computing systems in that rack to a network. The rack switch itself may be connected to an aggregation switch, which connects multiple racks to the network—sometimes referred to as end-of-row switches. In turn, the end-of-row switches are connected to core switches in a data center, which themselves are connected to external networks. Further, an enterprise data center may also include a storage area (SAN) and a management network, each of which use another set of interfaces on the switching and routing devices.

Plainly, the complex infrastructure for an enterprise computing environment or datacenter requires careful planning and configuration, and a variety of tools are available to help configure and manage an enterprise data center. For example, a data center administrator may specify which interface on a network device to use as a preferred interface for managing that device. Network discovery tools typically rely on the administrator to specify which interface should be used for management, e.g., the loopback address or a lowest/highest available IP address within a given network segment. In other cases, a network discovery tool may resort to a brute force approach to identify a management interface, i.e., each interface is checked for connectivity and manageability.

BRIEF DESCRIPTION OF THE DRAWINGS

So that the manner in which features presented herein can be understood in detail, a more particular description of the disclosure may be had by reference to embodiments, some of which are illustrated in the appended drawings. However, the appended drawings illustrate only typical embodiments and are therefore not limiting of its scope, for the disclosure may admit to other equally effective embodiments.

DESCRIPTION OF EXAMPLE EMBODIMENTS

Overview

One embodiment presented herein includes a method. Such a method may generally include discovering, by a network management application executing on a first computing system, a first interface on a network device and establishing a connection with the network device over the first interface. This method may further include generating an identification (ID) value and sending, over the connection established with the network device over the first interface, a message that includes the ID value. The message sent to the network device over the first interface provokes the network device to send a response message to the network management application over a second interface on the network device. In a particular embodiment the second interface corresponds to a preferred management interface of the network device.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

Example Embodiments

Embodiments presented herein provide techniques for identifying management interfaces on a network device (e.g., a switch or router) discovered via a network management system (NMS). The NMS includes existence discovery functions used to discover network devices that may be managed via the NMS. For example, to do so, the NMS may find a network device via the Cisco discovery protocol (CDP), routing analysis, by sending ICMP messages to a range of network addresses, or using any other suitable technique.

Once a device is discovered, the NMS attempts to connect to it, e.g., via Telnet or SSH. Provided a connection is established, if the NMS does not know which interface to use to manage the device, then in one embodiment, the NMS may provoke the device into sending a message to the NMS over the management interface. To do so, the NMS may generate an ID value to include a message sent to the network device. In one embodiment, the ID value may be included in a SNMP (simple network management protocol) message requesting that the device send the ID value back to the NMS over the management interface.

For example, the NMS may request the device send a "hello-trap send <id>" message to the NMS. This message requests that the device send a hello trap message over any trap destinations along with the ID value from the NMS/Controller. In one embodiment, if the address of the NMS is not configured as a trap destination, then the NMS may add itself as a trap destination prior to sending the "hello-trap send <id>" message to the network device. In any event, the request provokes the network device to send a "hello" trap to the NMS over the management interface on that device.

That is, using the SNMP trap mechanism may ensure that the device will respond over the management interface configured on that device. Further, such a trap response includes the <id> value. Once received, the NMS reconciles the <id> value provided by the NMS with the one received in the response message sent by the network device. The NMS identifies the source IP address of the hello trap message as the correct management address of the discovered device. Advantageously, certain embodiments may reduce or eliminate any guessing of an address strategy by the NMS or brute force testing of all interfaces.

In the following description, numerous specific details are set forth to provide a more thorough understanding of the embodiments. However, it will be apparent to one of skill in the art embodiments of the present disclosure may be practiced without one or more of these specific details. In other instances, well-known features have not been described to avoid obscuring the embodiments. In addition, while reference is made to a "router" as a network device that may be discovered and managed by a network management system (NMS), one of ordinary skill in the art will recognize that the techniques described herein may be used to discover the management interface on a variety of networking devices such as switches, routers, bridges, etc., including virtualized instances of such devices. Further, embodiments are described below using the known TCP/IP, SNMP, and ICMP network protocols. Of course, one of ordinary skill in the art will recognize that the techniques described herein may be used or adapted for use with these and a variety of other network protocols as appropriate for particular case.

Figure 1:
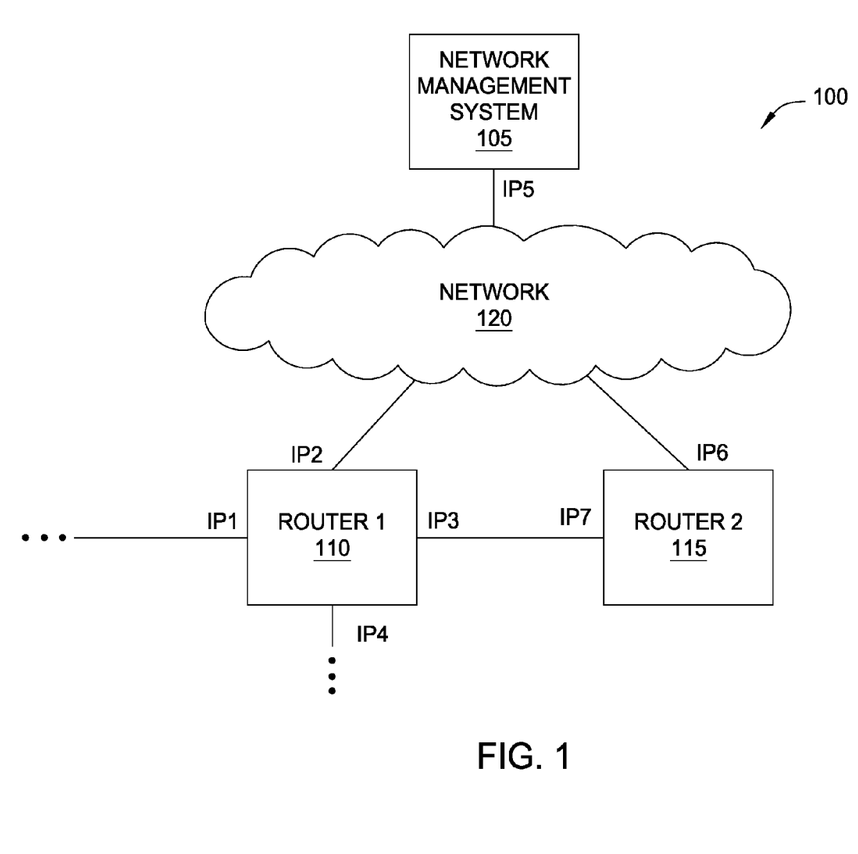
FIG. 1 illustrates an example computing environment, according to one embodiment.

FIG. 1 illustrates an example computing environment 100, according to one embodiment. As shown, the computing environment 100 includes a network management system (NMS) 105, a first router 110 "router 1" 10, and a second router 115 "router 2" 115, each connected to a network 120. The NMS 105 generally provides a computing system configured with one or more software applications used to discover, configure, and manage network devices, e.g., the first router 110 and the second router 115. A more detailed example of a computing system hosting an NMS tool is described relative to FIG. 5, below. The first router 110 and the second router 115 each generally provide a networking device configured to route and/or forward network traffic between hosts or between networks. Such a network device may provide a combination of software and hardware such as a forwarding engine, routing tables, and a variety of configuration tools and data. Further, the first router 110 and second router 115 may each be configured with a preferred management interface. For example, an interface on the first router 110 may host a configuration service such as a web based interface or a command line shell an administrator may use to configure and manage that router. A more detailed example of a routing device is described relative to FIG. 6, below In one embodiment, the NMS 105 may use a variety of techniques to discover interfaces on devices attached to the network 120. For example, the NMS 105 may be configured to send ICMP ping messages to a range of IP addresses and identify which addresses provide a response. Other approaches include the use of the Cisco discovery protocol (CDP) and observing address and route information in network packets on a local Ethernet segment. However identified, once a network device is found, the NMS 105 may attempt to establish a shell connection with the network device, e.g., an SSH or telnet session.

For example, assume the NMS 105 identifies an interface on the first router 110 reachable at an address "IP3" and that a shell session can be opened at this address. In such a case, while the NMS 105 now knows that a network device with at least the IP3 interface is part of the computing environment 100, but does not know which interface of that device should be used as the management interface for the network device which includes the IP3 interface. Conventionally, the NMS 105 could use a brute force approach and attempt to connect to every interface on the first router 110 in order to find the management interface of this device. However, doing so may take considerable amounts of wasted network traffic, particularity in large service provider data centers, or simply large amounts of time (e.g., while the NMS 105 waits for SNMP timeouts).

In one embodiment, the NMS 105 instead provokes the first router 110 to send a message over the management interface on the first router 110. For this example, assume that the IP2 interface is the preferred interface for managing the first router 110. That is, assume IP2 hosts the management interface for the first router 110. In such a case, the first router 110 may send a message to the NMS 110 over the IP2 interface. Further, such a message may include an ID sent by the NMS 105. The ID value allows the NMS 105 to correlate a response message received over the IP2 interface and the message sent by the NMS 105 to the IP3 interface.

For example, in one embodiment, the NMS 105 may use SNMP messaging to provoke a response from the first router 103. In such a case, after establishing a shell connection to the first router 110, the NMS 105 may request that the first router 110 send a trap message over each SNMP trap destination configured on the first router 110. The first router 110 (and second router 115) includes a software agent used to create and send such SNMP messages. In one embodiment, NMS 105 may generate a distinct ID value that the software agent on the first router 110 should include in the trap response. In addition, the NMS 105 may configure itself as a trap destination on the first router 110. In the example of FIG. 1, the NMS 105 would configure IP5 as a trap destination.

Once the first router 110 sends out a trap response provoked by the NMS 105, the NMS 105 correlates the ID value in the trap response. In the example of FIG. 1, the NMS 105 learns that IP2, a source address in the trap response, is the location of the management interface of the device which also includes the IP3 interface.

Figure 2:
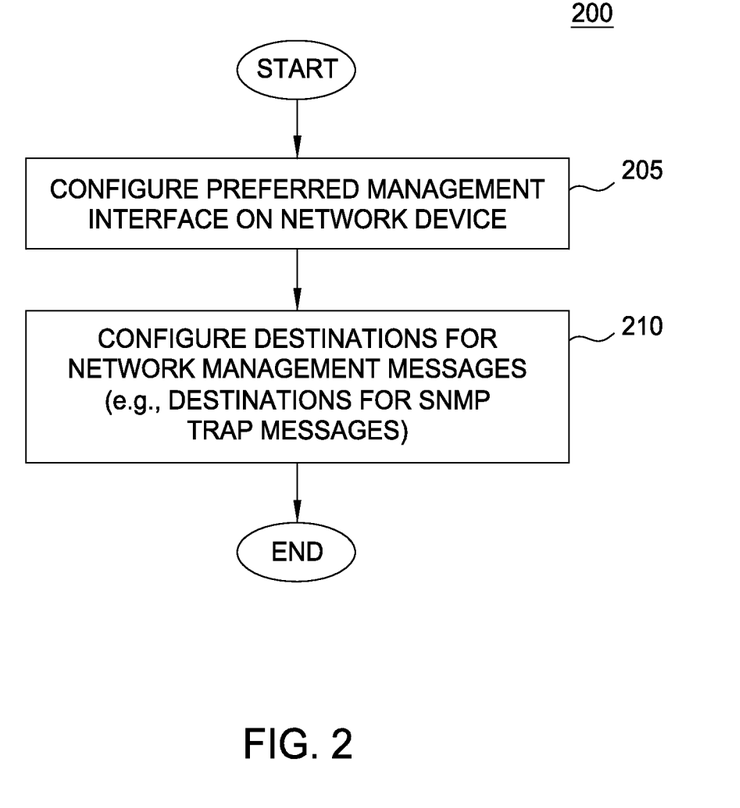
FIG. 2 illustrates a method for configuring a network router, according to one embodiment.

FIG. 2 illustrates a method 200 for configuring a network device, according to one embodiment. As shown, the method 200 begins at step 205 where an administrator configures a management interface on the network device. Such an interface may allow the administrator to connect to a command line tool used to configure the network device as well as to access other configuration and administrative tools. For example, the network device may host a local web-server used to configure the network device. At step 210, the administrator may configure one or more trap destinations for network management messages. For example, the administrator may specify an address of the NMS 105. However, as the NMS 105 may be deployed to discover such interfaces, in certain embodiments, the NMS 105 is not configured as a trap destination when the network device is initially configured.

Figure 3:
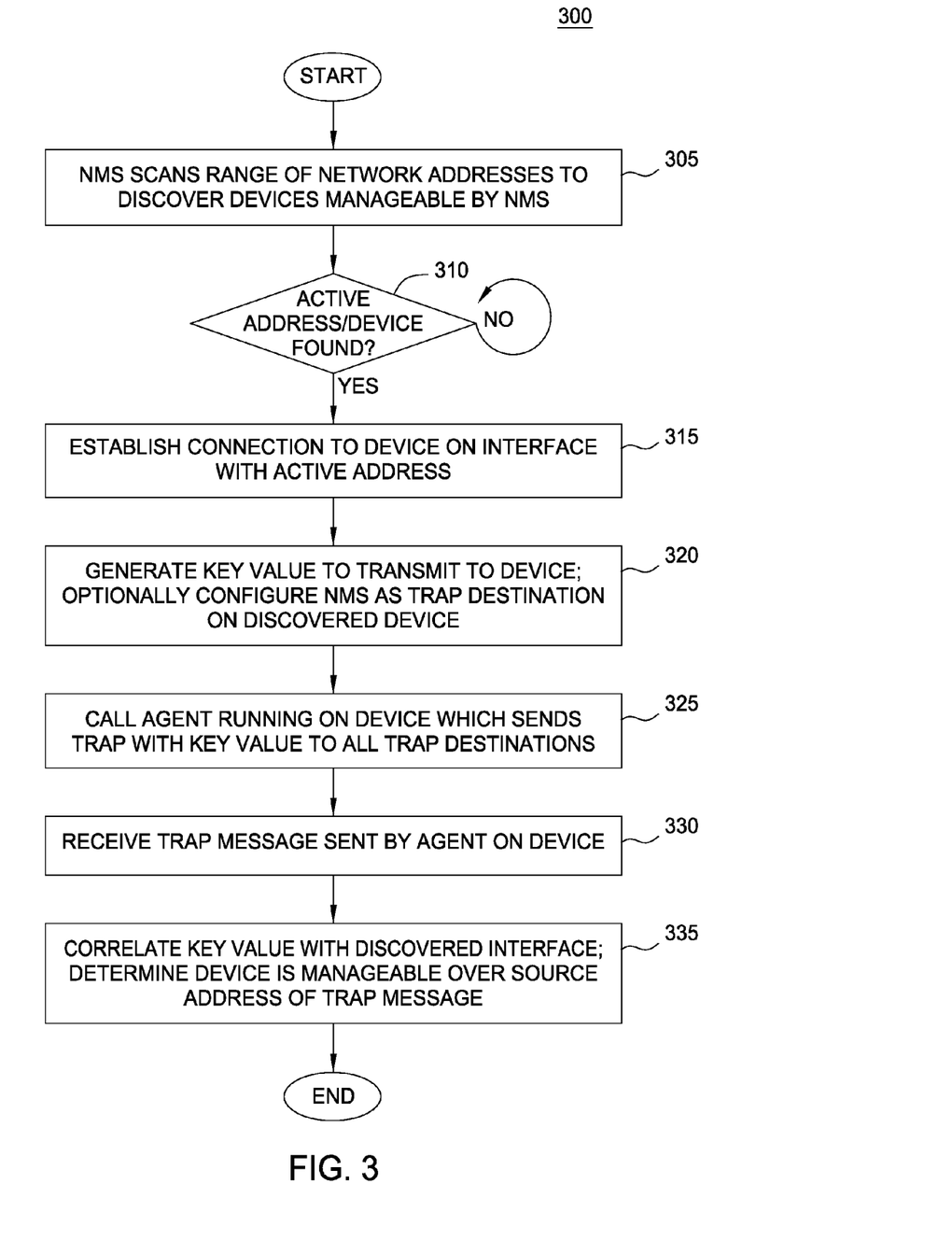
FIG. 3 illustrates a method for identifying a management address/interface via messages sent to a network management system, according to one embodiment.

FIG. 3 illustrates a method 300 for identifying a management address/interface via messages sent to a network management system, according to one embodiment. Certain steps of the method 300 are illustrated relative to FIGS.

4A-4D, which illustrate an example of the computing environment of FIG. 1 used to identify a management interface on a discovered device.

Figure 4A:
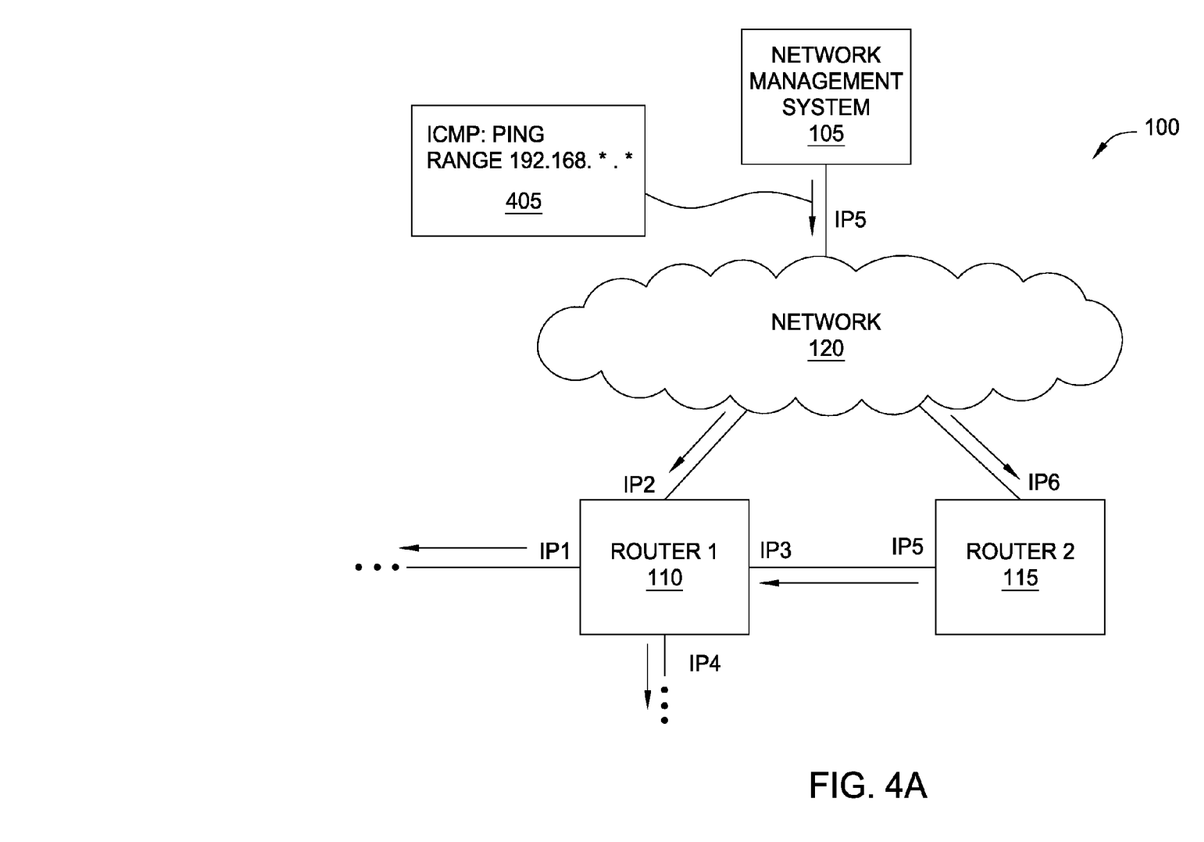
FIGS. 4A-4D illustrate the example computing environment of FIG. 1 used to identify a management interface on a discovered device, according to one embodiment.

As shown the method 300 begins at step 305 where an NMS 105 scans a range of network addresses to discover devices in a network infrastructure. As noted, in addition to scanning address segments, the NMS 105 may also use other discovery mechanisms, e.g., the Cisco discovery protocol (CDP) as well as traffic and routing analysis techniques. For example, FIG. 4A shows an ICMP message, i.e., ping messages, to a range of addresses. Specifically, to the class C private range of 192.168.0.0/16.

Figure 4B:
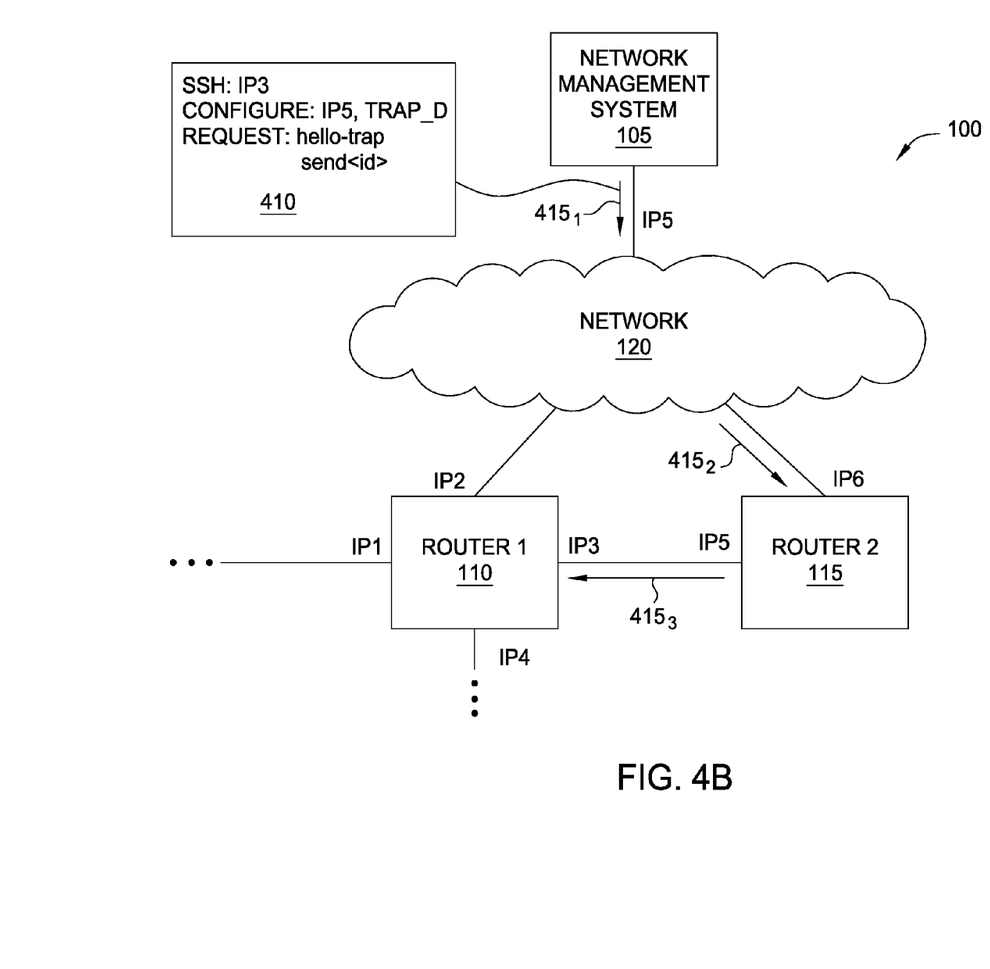

At step 310, the NMS 105 determines whether any unknown interfaces respond to the ICMP messages. In this example, assume that IP3 is an interface in this range on the first router 110 and responds to the ICMP message. At this point, the NMS 105 knows that there is an active interface at IP3. At step 315, the NMS 105 attempts to establish a connection with the discovered interface. Provided a connection is established, the NMS 105 generates a key value send to the network device over the discovered interface (step 320). As noted, the key value may be included in a message which provokes an SNMP trap response to be sent to the NMS 105 over the management interface of the discovered device. Additionally, the NMS 105 may configure itself as a trap destination for SNMP responses sent by the discovered device (if appropriate). At step 325, the NMS 105 calls an agent on the discovered device which causes a response to be sent to the NMS 105 over the management interface of the discovered device. For example, as shown in FIG. 4B, messages 410 are sent to IP3 of the first router 110 (represented by arrows $415_{1-3}$). The messages initiate a shell session with the first router 110, configure IP5 as a trap destination, and send a SNMP trap hello event to an agent on the first router 110 over which includes the <id> value.

Figure 4C:
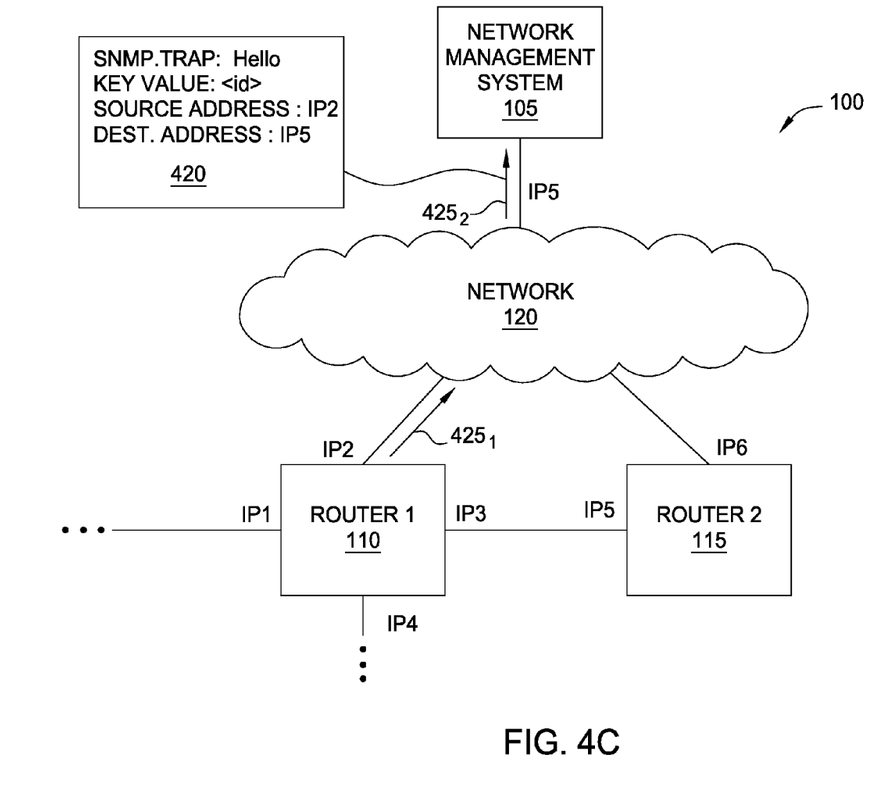
Figure 4D:
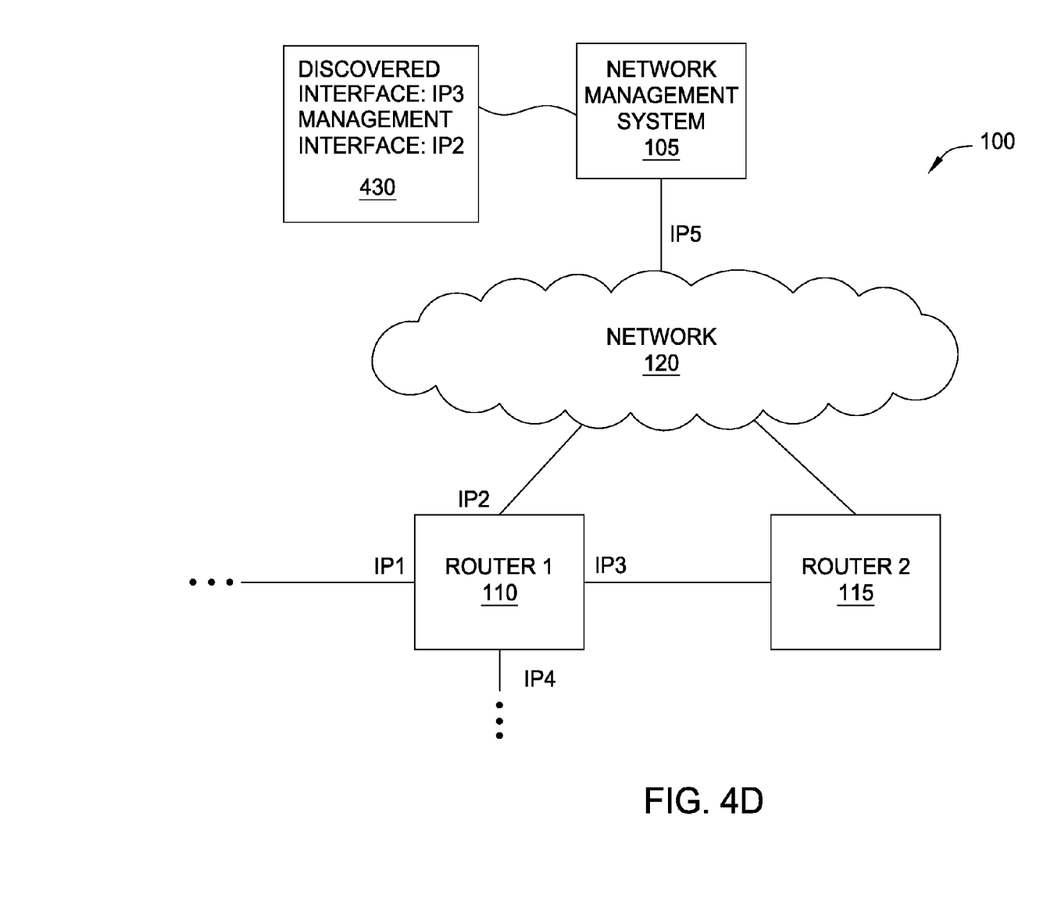

Returning to FIG. 3, at step 330, the NMS 105 receives the trap response message provoked by the NMS at step 325. For example, FIG. 4C illustrates a trap response message 420 sent from the first router 110 to the NMS 105. As shown by arrows $425_{1-2}$, the message 420 is sent over the management interface IP2 of the first router 110 to the trap destination. As shown, the message 420 includes the key value <id> and the source and destination address IP2 and IP5, respectively. At step 335, the NMS 105 correlates the <id> value received in the trap response with the message sent to the discovered device. That is, NMS 105 correlates the discovered interface of IP3 with the management interface of the first router 110—specifically IP2. The NMS 105 may store the results in a database reflecting all the known interfaces of a given network infrastructure. For example, FIG. 4D shows an entry 430 in an NMS database which lists the discovered interface—IP3—and the corresponding management interface—IP2—on the first router 110.

Figure 5:
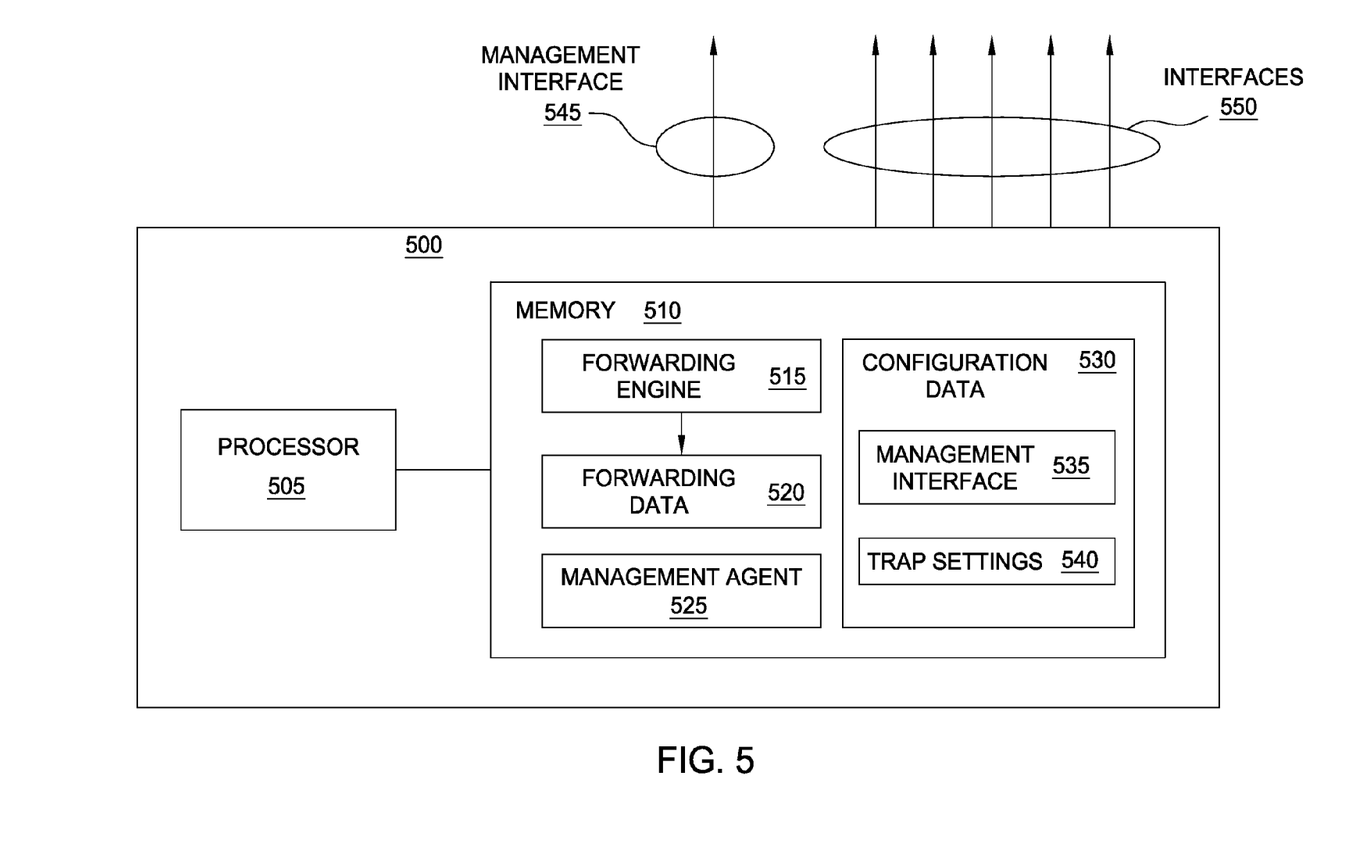
FIG. 5 illustrates an example network device with an agent configured to respond to a request to identify a management interface using a trap response, according to one embodiment.

FIG. 5 illustrates a routing device 500 with a network agent used to respond to a request to identify a management interface using a trap response, according to one embodiment. As shown, the routing device 500 includes a processor 505 and a memory 510. The memory 510 stores a forwarding engine 515 and forwarding data 520. The memory 510 also stores a management agent 525 and configuration data 530. The components of routing device 500 are provided for explanatory purposes. One of ordinary skill in the art will recognize that network switching and routing systems, real or virtual, may include a variety of additional components and known components and operations are not described in detail to avoid unnecessarily obscuring the techniques for discovering management interfaces presented in this disclosure.

The processor 505 generally provides a computing processor used to execute instructions stored in memory 510. For example, the forwarding engine 515 may inspect network traffic (e.g., IP packets) received on one of the interfaces 550 and forward it towards a destination over another one of the interfaces 550. Forwarding data 520 may provide routing information used by the engine 515 to make such a decision. For example, forwarding data 520 may identify an interface associated with a destination MAC address in the Ethernet frame and forward that frame over that interface or identify a route used to reach a given network address. Of course, routing device 500 may use a variety of known components to optimize routing and forwarding operations.

The management agent 525 may provide one or more applications executed by the processor 505 to configure and manage the operations of the routing device 500. Further, in one embodiment, the management agent 525 may be used to set trap settings 540, such as the trap destinations used by routing device 500, establish which interface should be used as the management interface 545 on routing device 500, as well as respond to a message from the NMS provoking the routing device 500 to send a message over the management interface 545.

Figure 6:
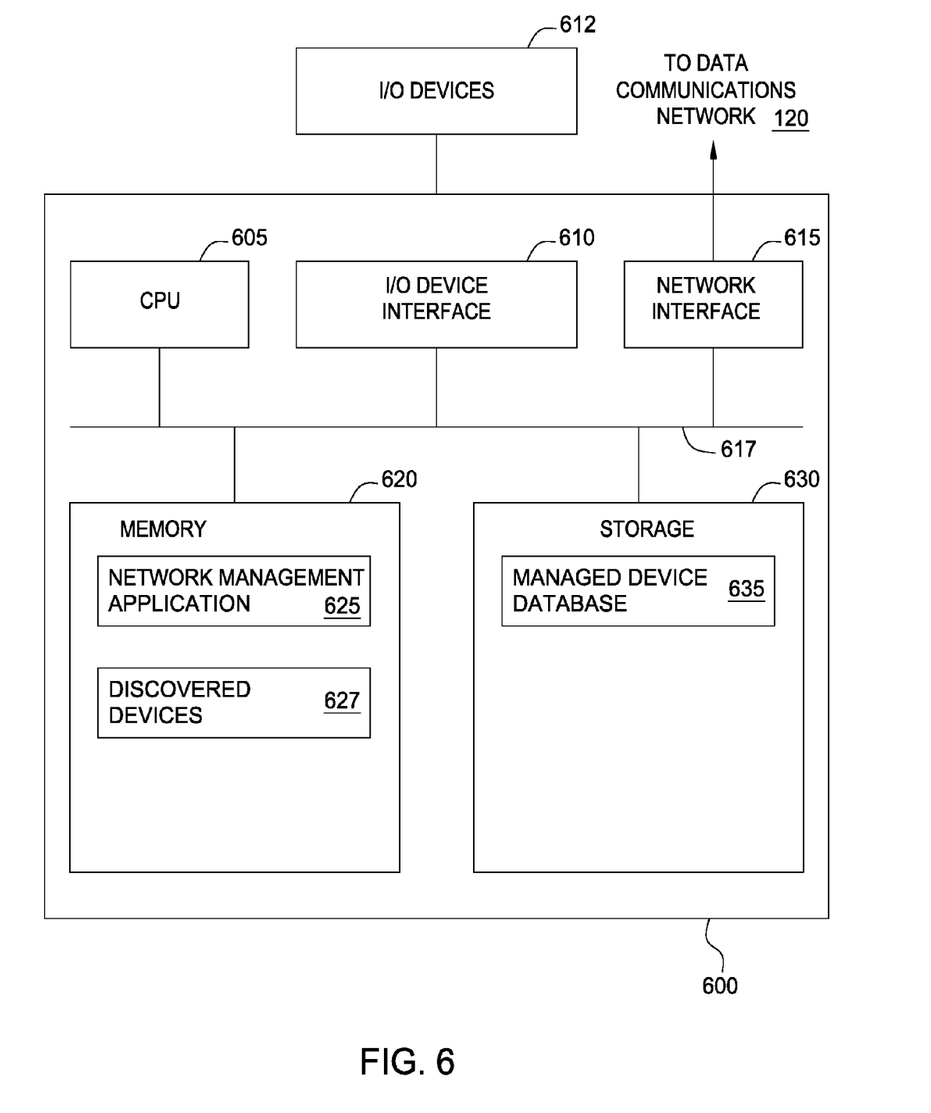
FIG. 6 illustrates an example computing system used to host a network management tool, according to one embodiment.

FIG. 6 illustrates an example computing system 600 used to host a network management tool, according to one embodiment. As shown, the computing system 600 includes, without limitation, a central processing unit (CPU) 605, a network interface 615, a memory 620, and storage 630, each connected to a bus 617. The computing system 600 may also include an I/O device interface 610 connecting I/O devices 612 (e.g., keyboard, mouse, and display devices) to the computing system 600. Further, in context of this disclosure, the computing elements shown in computing system 600 may correspond to a physical computing system (e.g., a system in a data center) or may be a virtual computing instance executing within a computing cloud.

The CPU 605 retrieves and executes programming instructions stored in the memory 620 as well as stores and retrieves application data residing in the memory 630. The interconnect 617 is used to transmit programming instructions and application data between the CPU 605, I/O devices interface 610, storage 630, network interface 615, and memory 620. Note, CPU 605 is included to be representative of a single CPU, multiple CPUs, a single CPU having multiple processing cores, and the like. And the memory 620 is generally included to be representative of a random access memory. The storage 630 may be a disk drive storage device. Although shown as a single unit, the storage 630 may be a combination of fixed and/or removable storage devices, such as fixed disc drives, removable memory cards, or optical storage, network attached storage (NAS), or a storage area-network (SAN).

Illustratively, the memory 620 stores a network management application 625 and discovered devices 627. The storage 630 stores a managed device database 635. The network management application 625 generally provides a software application used to discover devices in a network, as described above. Accordingly, the network management application 625 may be configured to discover an active interface on a routing device in a network and provoke that device to send a message to the network management application 625 over the preferred management interface of that device. Further, as noted, such a provoked response may include an <id> value used to correlate the provoked response with the active interface of the discovered device 627.

Once the preferred managed interface of a newly discovered network device is identified, the network management application 625 can update the managed device database 635. Advantageously, the approach described above may reduce or eliminate any guessing of an address strategy by the network management system or brute force testing of all interfaces. Instead, certain embodiments may allow the network management system to rapidly discover the preferred management interfaces of devices in a network.

While the foregoing is directed to embodiments of the present disclosure, other and further embodiments of the disclosure may be devised without departing from the basic scope thereof. For example, aspects of the present disclosure may be implemented in hardware, software, or a combination of hardware and software. One embodiment of the disclosure may be implemented as a program product for use with a computer system. The program(s) of the program product define functions of the embodiments (including the methods described herein) and can be contained on a variety of computer-readable storage media. Illustrative non-transitory computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., a hard-disk drive or any type of solid-state random-access semiconductor memory) on which alterable information is stored. Such computer-readable storage media, when carrying computer-readable instructions that direct the functions of the present disclosure, are embodiments of the present disclosure.

Although certain embodiments may achieve advantages over other possible solutions and/or over the prior art, whether a particular advantage is achieved by a given embodiment is not limiting. Thus, the following aspects, features, embodiments and advantages are merely illustrative and are not considered elements or limitations of the appended claims except where explicitly recited in a claim(s).

Aspects of the present disclosure may be embodied as a system, method or computer program product. Accordingly, embodiments presented herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

The flowchart and block diagrams in the Figures illustrate the architecture, functionality, and operation of possible implementations of systems, methods, and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet.

In view of the foregoing, the scope of the present disclosure is determined by the claims that follow.

What is claimed is:

1. A computer-implemented method, comprising:
   discovering, by a network management application executing on a first computing system, a first interface on a network device;
   establishing a connection with the network device over the first interface;
   generating an identification (ID) value;
   sending, over the connection established with the network device over the first interface, a message that includes the ID value, wherein the message provokes the network device to send a response message to the network management application over a second interface on the network device;
   receiving, by the network management application, the response message; and
   managing the network device, by the network management application, using network management messages sent over the second interface.

2. The method of claim 1, wherein the message sent over the connection established with the network device over the first interface comprises a simple network management protocol (SNMP) message.

3. The method of claim 2, further comprising:
   prior to sending the message to provide the response message, configuring an address of the network management interface as a trap destination for SNMP trap messages sent by the network device.

4. The method of claim 1, wherein the second interface corresponds to a preferred management interface of the network device.

5. The method of claim 4, further comprising:
   correlating the ID value received over the second interface with the ID value sent over the first interface.

6. The method of claim 1, wherein discovering the first interface on the network device comprises sending ICMP messages to a range of network addresses.

7. The method of claim 1, wherein establishing a connection with the network device over the first interface comprises establishing a shell connection with the network device, wherein the shell connection provides a command line interface used to provoke the response message.

8. A non-transitory computer-readable storage medium storing instructions executed on a processor, wherein the code, when executed by a processor, performs an operation, the operation comprising:
   discovering, by a network management application executing on a first computing system, a first interface on a network device;
   establishing a connection with the network device over the first interface;
   generating an identification (ID) value;
   sending, over the connection established with the network device over the first interface, a message that includes the ID value, wherein the message provokes the network device to send a response message to the network management application over a second interface on the network device; and
   receiving, by the network management application, the response message; and
   managing the network device, by the network management application, using network management messages sent over the second interface.

9. The non-transitory computer-readable storage medium of claim 8, wherein the message sent over the connection established with the network device over the first interface comprises a simple network management protocol (SNMP) message.

10. The non-transitory computer-readable storage medium of claim 9, wherein the operation further comprises:
   prior to sending the message to provide the response message, configuring an address of the network management interface as a trap destination for SNMP trap messages sent by the network device.

11. The non-transitory computer-readable storage medium of claim 8, wherein the second interface corresponds to a preferred management interface of the network device.

12. The non-transitory computer-readable storage medium of claim 11, wherein the operation further comprises:
   correlating the ID value received over the second interface with the ID value sent over the first interface.

13. The non-transitory computer-readable storage medium of claim 8, wherein discovering the first interface on the network device comprises sending ICMP messages to a range of network addresses and receiving, from the network device over the first interface, an ICMP response.

14. The non-transitory computer-readable storage medium of claim 8, wherein establishing a connection with the network device over the first interface comprises establishing a shell connection with the network device, wherein the shell connection provides a command line interface used to provoke the response message.

15. A system, comprising:
   a processor; and
   a memory hosting an application, which, when executed on the processor, performs operations comprising:
      discovering, by a network management application executing on a first computing system, a first interface on a network device,
      establishing a connection with the network device over the first interface,
      generating an identification (ID) value,
      sending, over the connection established with the network device over the first interface, a message that includes the ID value, wherein the message provokes the network device to send a response message to the network management application over a second interface on the network device, and
      receiving, by the network management application, the response message; and
      managing the network device, by the network management application, using network management messages sent over the second interface.

16. The system of claim 15, wherein the message sent over the connection established with the network device over the first interface comprises a simple network management protocol (SNMP) message.

17. The system of claim 16, wherein the operation further comprises:
   prior to sending the message to provide the response message, configuring an address of the network management interface as a trap destination for SNMP trap messages sent by the network device.

18. The system of claim 15, wherein the second interface corresponds to a preferred management interface of the network device.

19. The system of claim 18, wherein the operation further comprises:
   correlating the ID value received over the second interface with the ID value sent over the first interface.

20. The system of claim 15, wherein discovering the first interface on the network device comprises sending ICMP messages to a range of network addresses and receiving, from the network device over the first interface, an ICMP response.

* * * * *